United States Patent Office 3,528,944
Patented Sept. 15, 1970

3,528,944
ALKOXYMETHYLATION OF A POLYALKYLENE OR POLYARYLALKYLENE UREA OR POLYMERS THEREOF
Faber B. Jones, Bartlesville, Okla., assignor to Phillips Petroleum Company, a corporation of Delaware
No Drawing. Filed Aug. 29, 1966, Ser. No. 575,907
Int. Cl. C08g 9/10
U.S. Cl. 260—70                    10 Claims

ABSTRACT OF THE DISCLOSURE

Polyalkylene and/or arylalkylene urea polymers are partially alkoxymethylated to form adhesives and other useful products by treating the polymers with, say, an alcoholic paraformaldehyde mixture or its equivalent, the polymer being dissolved in, say, formic acid.

---

This invention relates to alkoxymethylation. In one of its aspects, it relates to alkoxymethylation of certain urea resins, e.g., polyalkylene or arylalkylene urea polymers. In another of its aspects, it relates to alkoxymethylation of such polymers employing an alcoholic paraformaldehyde mixture in formic acid. In a further aspect, the invention relates to an alkoxymethylated urea. Further, in still another aspect, it relates to the use of an alkoxymethylated polyurea as or in an adhesive.

I have now found that alkoxymethylation of polyalkylene and arylalkylene urea polymers, under conditions which are controlled in accordance with the invention, will produce materials useful as adhesives. These adhesives are of varying strengths, solubilities, and structures.

It is an object of this invention to produce alkoxymethylated material. It is a further object of the invention to produce an alkoxymethylated polyurea. It is another object of this invention to alkoxymethylate certain materials to produce adhesives of varying strengths, solubilities and structures. It is a further object of this invention to produce certain alkoxymethylated polymers.

Other aspects, objects and the several advantages of this invention are apparent from this disclosure and the appended claims.

According to the present invention, a urea resin, e.g., polyalkylene and polyarylalkylene ureas or polymers are at least partially alkoxymethylated employing an alcoholic paraformaldehyde mixture in formic acid. The temperature of the reaction generally is in, though it is not in its broadest form limited to, the range of from about 20 to about 150° C., preferably being within the range of from about 50 to about 80° C. The reaction time can vary considerably, depending in part on the reaction temperature and the nature of the reactants, but will generally be within the range of about 10 minutes to about 6 hours. The pressure need be only sufficient to maintain the components of the reaction mixture substantially in condensed phase. The ratio on a molar basis of the alcohol to formaldehyde derived from the paraformaldehyde usually will be in the approximate range of about 0.8:1 to 8:1. The ratio of formaldehyde molecules derived from the paraformaldehyde to hydrogen atoms in the ureylene groups in the urea resin will generally be within the range of about 0.1:1 to 2:1, depending in part on the desired degree of substitution of ureylene hydrogen atoms by alkoxymethyl groups. Preferably, although not necessarily, the alcoholic solution of formaldehyde derived from the paraformaldehyde is added to the urea resin in formic acid. Addition of a base to the paraformaldehyde in alcohol promotes depolymerization of the paraformaldehyde, thereby resulting in a solution of solvated formaldehyde. The examples herein further illustrate the ratios and conditions of the reactions of the invention and the products obtained.

As used herein, the term polyalkylene and polyarylalkylene ureas is meant to include polymers containing recurring ureylene linkages separated by divalent hydrocarbon radicals such as alkylene, cycloalkylene, and arylene, and combinations thereof such as aralkylene, alkarylene, and the like, including alkylene in which a methylene group is replaced by arylene, cycloalkylene, or the like.

A polyhexamethylene urea was methoxymethylated by an equimolar mixture of methanol and paraformaldehyde. Excess stoichiometric amounts of this mixture were used, based on available ureylene hydrogen. A light brown, clear, alcohol soluble product was obtained which cured spontaneously on drying to a tough film. A new, very brittle polymer, poly-m-xylylene urea was similarly treated and improved.

The new, brittle polymer here mentioned was prepared by a process set forth and claimed in my copending application Ser. No. 575,976, filed Aug. 30, 1966. Polymers are also claimed in that application, the disclosure of which is incorporated herein by reference.

EXAMPLE I

Methoxymethylation of hexamethylene urea polymer 20 grams pulverized hexamethylene urea polymer (0.28 eq. ureylene H)
10 grams paraformaldehyde (0.33 eq.) disolved with warming to 60° C.
10 grams absolute methanol (0.31 eq.)
0.1 gram NaOH (1 pellet)

The 20 grams of polymer were dissolved in aqueous formic acid (180 grams 97 percent acid+20 ml. water) at 60–70° C. giving a medium amber colored clear solution.

The methanol-paraformaldehyde solution was quickly added (2–3 min.) to the stirred solution. Exactly 10 minutes after addition started an additional 10 grams methanol was added at 63° C. and stirring continued for another 20 minutes.

The solution became gelatinous and about 300 ml. acetone was added which gave a nearly smooth solution after about 15 minutes. After another 15 minutes about 50 ml. of additional methanol was used to dissolve a few remaining gelatinous particles. After one hour about 300 ml. of water was added resulting in a clear, medium brown solution. Concentrated ammonium hydroxide was added until the solution was barely alkaline (litmus) and the mixture was allowed to cool. A soft gelatinous mass separated which was washed with water in which it appeared very slightly soluble. The water was decanted, and 150 ml. of methanol was added. Then 150 ml. of i-propanol was added, and the major portion of the methanol was stripped off. Upon evaporation of the solvent from a portion of this solution, a clear amber tough film was recovered.

EXAMPLE II

A run similar to that of Example I was made using a polyhexamethylene urea but changing the mole ratio of methanol:paraformaldehyde from 1:1 to 4:1.

|  | Grams |
| --- | --- |
| Hexamethylene urea polymer [1] | 20 |
| Formic acid [2] (97%) | 180 |
| Paraformaldehyde [2] | 5 |
| Methanol [2] | 20 |
| NaOH (1 pellet) [2] | 0.1 |

[1] Dissolved at 70° C.
[2] Dissolved at 40–50° C.

This yielded a tough, apparaently amorphous solid that could be dried and handled. This product could be heat softened at about 200° C. and pressed into tough film. After addition of ammonium hydroxide, a soft, flocculent precipitate formed, which was separated, washed and vacuum dried at 50° C. for 72 hours. The product appeared to have methoxymethyl groups substituted on about 10–20 percent of the available ureylene hydrogen sites. The product formed a tough resilient film from its solution in i-propanol.

EXAMPLE III

Methoxymethylation of m-xylylene urea polymer

Using a 2:1 mole ratio of methanol to paraformaldehyde at less than stoichiometric levels, it was possible to treat this polymer slurried in formic acid at 65–70° C. The polymer was only partially soluble in the hot formic acid but it became more soluble as the treatment progressed.

| | Grams |
|---|---|
| Poly-m-xylylene urea | 20 |
| Formic acid (97%) | 180 |
| Water | 20 |
| Paraformaldehyde [1] | 10 |
| Methanol [1] | 20 |
| NaOH (1 pellet) [1] | 0.1 |

[1] Dissolved at 60° C.

The polymer did not completely dissolve in the aqueous formic acid but the methoxymethylating mixture was added to the slurry of polymer in formic acid at 60° C.

Another 20 grams methanol was added and heating was continued for 30 minutes. Then 300 ml. acetone and 300 ml. water were added and the resulting solution made slightly alkaline with concentrated NH₄OH. A fluocculent, sticky precipitate was formed, separated, washed with water and i-propanol, then dried under vacuum at 90° C. for 16 hours.

The bonding and adhesive properties, as well as other properties, of these samples, were determined. The primary adhesive test was determination of room temperature lap shear strength of aluminum coupons bonded together by a 3–4 mil thickness layer of the polymer to be evaluated. Immediately before use, the 1 x 4 x 0.065 inch aluminum (2024T alloy) coupons were vapor degreased in trichloroethylene and then immersed in a solution of 500 grams water/150 grams concentrated H₂SO₄/50 grams sodium dichromate at 70° C. for 15 minutes. Following the acid pickle, the coupons were washed three times with distilled water and oven dried one hour at 70–80° C. After this treatment, the coupons had a bright surface that was readily water wetted. Adequate surface treatment is well known to be of critical importance to obtaining maximum adhesion and bond strength in metal adhesives technology.

The actual bonding procedure used in this work involved assembly of the shear specimens at room temperature in a special positioning jig that held to a close tolerance the desired ½ inch overlap in the bond test area and a nominal adhesive thickness of 3–4 mils. The jig was so arranged that ten specimens could be bonded simultaneously. After assembly the positioning jig was placed in a laboratory hydraulic press preheated to the desired bonding temperature and press was closed under a low pressure sufficient to just clamp the jig firmly (estimated 10 p.s.i. or less on specimen). Bonding temperature varied from 150–300° C. depending on the melting characteristics of each particular polymer studied. After 15 minutes the jig was force cooled while closed before removing the bonded specimens.

After bonding the lap shear specimens were carefully trimmed with a high speed hand grinder to remove any flash from the bond edges and conditioned 24 hours at room temperature before testing. Lap shear strength measurements were conducted using an Instron Model TT 10,000 pound load range Universal Tester by failure to destruction at a strain rate of 0.05 inch per minute (ASTM Method D1002-53T). Lap shear strength values are expressed in pounds per square inch (p.s.i.) of bonded area and ultimate shear strain is recorded as maximum bond deformation before failure, in inches. All lap shear tests were run in duplicate and average values reported; in most cases reproducibility between samples was higher than 90 percent. In addition to the quantitative measurements of stress and strain, the condition of the destroyed bond was qualitatively observed for adhesive uniformity and failure mode in either adhesion or cohesion.

The polymers which have been treated according to the invention are somewhat difficult to dissolve and, therefore, an acid medium is required for the reaction, hence the use of formic acid.

The use of trioxane, i.e., formaldehyde trimer, in lieu of the formaldehyde is possible but, of course, more expensive at the present time. The use of aqueous formaldehyde is now not thought desirable in view of the large amount of water in which polymers would ordinarily not be soluble.

The alcohol can be one having up to about 8 carbon atoms in the molecule. Mixture of alcohols can be used. Presently, in view of solubility considerations, alcohols having over 4 carbons are not as suited as are those having 1–4 carbon atoms. Thus, to the extent higher alcohols, say, pentanol-1, pentanol-2, hexanol-3, 3-methylhexanol-1, octanol-2, cyclohexanol, and the like, may yield results acceptable to the operator, they are within the scope of the basic concept of the invention. Thus, the alcohols now preferred include alcohols such as methanol, ethanol, propanol, i-propanol, butanol and butanol-2.

The invention has been described to enable one skilled in the art to which it relates to practice the same. However, the following is a further description which can be helpful. Generally, the desired range of alkoxymethylation will be from 5–30 percent of the vailable ureylene groups, preferably 10–25 percent. The amount of available formaldehyde and contact time can be calculated and tested for every urea resin composition.

The alkoxymethylated polyurea can be represented by the formula

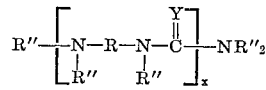

wherein R is a divalent hydrocarbon radical having 2–20 carbon atoms; R″ is a member selected from the group consisting of hydrogen and R′OCH₂, 5–30 percent of the R″s in each molecule of said alkoxymethylated polyurea being R′OCH₂; R′ is an alkyl radical having 1–8 carbon atoms; Y is a member selected from the group consisting of oxygen and sulfur; and x is an integer in the approximate range of 30–300. The polyurea which is employed in the alkoxymethylation process can be represented by the formula

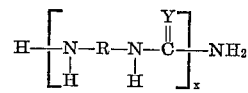

wherein R, Y and x are as defined above.

As noted, these alkoxymethylated polyureas are particularly useful in adhesive formulations but it is possible to use them in other plastic applications, e.g., in forming fibers, especially in case of the thioureas, and also in the preparation of protective or decorative coatings.

The results are given in the table in column 5 of this specification.

It can be seen that the methoxymethylated hexamethylene urea polymer had a lap shear strength substantially higher than the initial material and higher than some commercial adhesives. The methoxymethylated poly-m-xylylene urea exhibited much greater lap shear strength than did the unmodified m-xylylene urea polymer.

I believe that the modified poly-m-xylylene urea and the modified polyhexamethylene urea of the above examples contain the following structural units:

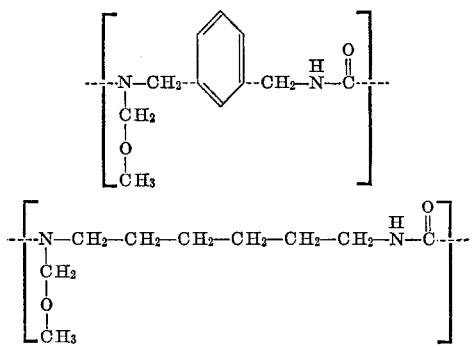

4. A process according to claim 3 wherein the temperature during the treatment is in the approximate range 20–150° C. and the ratio on a molar basis of alcohol to formaldehyde as derived from paraformaldehyde is in the approximate range 0.8:1 to 8:1.

5. A process according to claim 4 wherein the formaldehyde is present in a ratio of moles thereof to hydrogen atoms in the ureylene groups in the urea resin in the approximate range 0.1:1 to 2:1.

6. A process according to claim 2 wherein the alcohol is at least one of those having 1–4 carbon atoms to a molecule.

7. A process according to claim 1 wherein the polymer is hexamethylene urea polymer dissolved in formic acid and the alkoxymethylation is effected employing an alcohol having 1–4 carbon atoms to a molecule.

8. A process according to claim 1 wherein the urea polymer is dissolved in formic acid, the alkoxymethylation is effected by adding to the urea polymer solution a solution of paraformaldehyde in methanol and containing a trace or minor amount of alkali metal hydroxide.

TABLE

| Sample No. | Polymer type | Polymerization method | Inherent viscosity, dl./gm. | Softening temp., °C. | Melt point, °C. | Bonding temp., °C. | Lap shear strength, p.s.i. | Ultimate shear strain, inches | Adhesive film appearance |
|---|---|---|---|---|---|---|---|---|---|
| 1 | Polyhexamethylene urea | Melt | [1] Insol. | 245–250 | | 300 | 715 | 0.017 | Discontinuous, many voids. |
| 2 | do | Dispersion | [2] 0.25 | 270–275 | 281 | 300 | 1,045 | 0.024 | Do. |
| 3 | Methoxymethylated polyhexamethylene urea | | | 200 | | 250 | [3] 1,710 | 0.043 | Few small voids. |
| 4 | Methoxymethylated poly-m-xylylene urea | | | 225–250 | | 285 | 1,070 | 0.018 | Continuous. |
| 5 | Commercial dimer acid based polyamide | | 0.25 | 105–110 | | 175 | 375 | 0.10 | Do. |
| | | | | | | 200 | 510 | 0.10 | Fine bubbles. |
| 6 | Commercial carboxylated polyethylene | | | 100 | 95 | 180 | 1,575 | 0.044 | Continuous. |

[1] Insoluble in either m-cresol or formic acid at room temperature, soluble in formic acid above 50–60° C.
[2] Determined in formic acid at 30° C.
[3] 100 percent cohesive failure.

Reasonable variation and modification are possible within the scope of the foregoing disclosure and the appended claims to the invention, the essence of which is that polyalkylene and/or arylalkylene urea polymers have been partially alkoxymethyated to form adhesives and other useful products by treating said polymers with an alcoholic paraformaldehyde mixture or its equivalent, the polymer being dissolved in formic acid substantially as set forth and described herein.

I claim:

1. A process for the alkoxymethylation of at least one urea polymer which comprises dissolving the same in a suitable acid solvent medium and placing the same under alkoxymethylation conditions and wherein the urea polymer has the formula

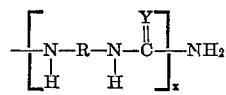

wherein R is a divalent hydrocarbon radical having 2–20 carbon atoms, Y is a member selected from the group consisting of oxygen and sulfur, and $x$ is an integer in the approximate range 30–300.

2. A process according to claim 1 wherein the polymer is at least one of a polyalkylene or polyarylalkylene urea polymer, the solvent is formic acid which will suitably dissolve the polymer under the conditions of the reaction and there is used to treat the polymer an alcoholic solution of paraformaldehyde.

3. A process according to claim 2 wherein the polymer is hexamethylene urea polymer.

9. An alkoxymethylated polyurea having the formula

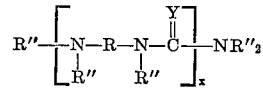

wherein R is a divalent hydrocarbon radical having 2–20 carbon atoms; R″ is a member selected from the group consisting of hydrogen and R′OCH$_2$, 5–30 percent of the R″s in each molecule of said alkoxymethylated polyurea being R′OCH$_2$; R′ is an alkyl radical having 1–8 carbon atoms; Y is a member selected from the group consisting of oxygen and sulfur; and $x$ is an integer in the approximate range of 30–300.

10. An alkoxymethylated polymer consisting essentially of the following structural unit

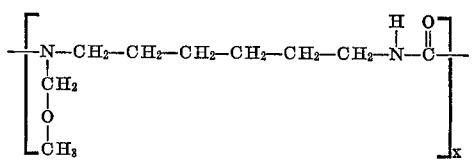

wherein $x$ is an integer in the approximate range of 30–300.

References Cited

UNITED STATES PATENTS 2,689,239  9/1954  Melamed _____ 260—70
2,699,435  1/1955  Auten et al.

WILLIAM H. SHORT, Primary Examiner

T. E. PERTILLA, Assistant Examiner

U.S. Cl. X.R.

117—161; 161—186; 260—31.2, 33.4

UNITED STATES PATENT OFFICE

CERTIFICATE OF CORRECTION

Patent No. 3,528,944        Faber B. Jones        Dated: September 15, 1970

It is certified that error appears in the above-identified patent and that said Letters Patent are hereby corrected as shown below:

Column 5, line 56+, there should be an H before the bracket of the formula as follows:

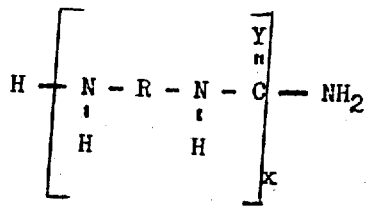

SIGNED AND
SEALED
DEC 29 1970

DEC. 29, 1970

EAL)

test:

ward M. Fletcher, Jr.
esting Officer

WILLIAM E. SCHUYLER, JR.
                                               Commissioner of Patents